United States Patent [19]

Hirai et al.

[11] Patent Number: 4,494,941

[45] Date of Patent: Jan. 22, 1985

[54] CONSTANT VELOCITY UNIVERSAL JOINT

[75] Inventors: Seiichi Hirai, Hidaka; Nobuyuki Otsuka, Kawagoe, both of Japan

[73] Assignee: Honda Giken Kogyo Kabushiki Kaisha, Tokyo, Japan

[21] Appl. No.: 370,076

[22] Filed: Apr. 20, 1982

[30] Foreign Application Priority Data

Apr. 24, 1981 [JP] Japan .................................. 56-61488

[51] Int. Cl.³ ................................................ F16D 3/24
[52] U.S. Cl. .................................... 464/145; 464/906
[58] Field of Search ........................ 464/145, 146, 906

[56] References Cited

U.S. PATENT DOCUMENTS

| 2,046,584 | 7/1936 | Rzeppa | 464/146 X |
| 3,475,924 | 11/1969 | Aucktor | 464/145 X |
| 3,934,429 | 1/1976 | Takahashi et al. | 464/906 X |
| 4,156,353 | 5/1979 | Welschof | 464/145 |
| 4,188,803 | 2/1980 | Otsuka et al. | 464/906 X |
| 4,231,232 | 11/1980 | Otsuka et al. | 464/146 |

FOREIGN PATENT DOCUMENTS

| 720584 | 11/1966 | Italy | 464/145 |
| 2041160 | 9/1980 | United Kingdom | 464/145 |

Primary Examiner—Stuart S. Levy
Assistant Examiner—Daniel P. Stodola
Attorney, Agent, or Firm—Posnack, Roberts, Cohen & Spiecens

[57] ABSTRACT

A constant velocity universal joint comprising an outer member having an inner spherical surface and an inner member fitted in the outer member and having an outer spherical surface facing the inner spherical surface of the outer member. The inner and outer members are adapted for relative angular travel about the center of the joint. A cage member is interposed between the inner and outer members and has an outer spherical surface facing the inner spherical surface of the outer member and an inner spherical surface facing the outer spherical surface of the inner member. The cage member carries balls in windows which project outwardly for engagement in respective opposed ball grooves in the inner and outer members. The mutually facing spherical surfaces of the outer member and the cage member are slightly eccentric with respect to one another so that a gap formed between the two spherical surfaces gradually decreases towards one end of the joint and the surfaces come into contact in a first contact zone, while the mutually facing spherical surfaces of the inner member and the cage member are slightly eccentric with respect to one from another so that a second gap formed between these two spherical surfaces decreases gradually towards the other end of the joint and these surfaces come into contact at a second contact zone. The first and second contact zones of the cage respectively with said outer and inner members maintain the cage in axial position in the joint.

18 Claims, 5 Drawing Figures

PRIOR ART ance with the method of the invention,
CONSTANT VELOCITY UNIVERSAL JOINT

FIELD OF THE INVENTION

The invention relates to a constant velocity universal joint particularly applicable to a vehicle, such as a motorcar or the like.

PRIOR ART

A conventional joint of this type is shown in FIG. 1 and comprises an outer member a and an inner member b mounted together through a cage member c. The cage member has an outer spherical surface m and an inner spherical surface n which are in respective surface contact with inner spherical surface O of outer member a and outer spherical surface P of inner member b. The cage member c is provided with a plurality of windows d containing respective balls e. The balls e are in engagement with respective pairs of grooves f formed in the mutually facing surfaces O and P of the outer member a and the inner member b.

The arrangement of the joint is such that the inner and outer members can undergo relative angular travel around the center O of the joint. It has been found in this type of joint that gaps g are unavoidably formed between the respective members a, b, and c, due to manufacturing tolerances, the gaps being shown with exaggeration in the Figure. As a consequence of the gaps, the cage member c is more or less movable towards one end or the other end of the joint. Accordingly, the joint has the disadvantage that, during operation thereof, each ball e is capable of being moved towards one end (to the right in FIG. 1) from the joint center O along with the cage member c as shown in FIG. 2 under the action of a pushing force F generated between the guide grooves f and then return to its initial position upon cessation of the pushing force. Thus the cage member c sways from side to side between the two members a, b which causes an increase in noise and shortening of the service life of the joint. In greater detail, the guide grooves f are so constructed that their bottom surfaces are mutually eccentric spherical surfaces which define a wedge form for grooves f which gradually widen towards the open end of the joint. Each ball e is thereby subjected to pushing force F in the direction of the arrow in FIG. 1 by reason of the wedge form of grooves f, and the ball moves towards the open end as shown in FIG. 2 until it is released from the pushing force F. Consequently, the cage member c is caused by the ball e to move back and forth from one side to the other which is highly undesirable.

SUMMARY OF THE INVENTION

An object of the invention is to provide a constant velocity universal joint which is free from the disadvantages noted above, particularly the ability of the cage to move axially back and forth.

In accordance with the above and further objects of the invention, there is provided an improved constant velocity universal joint which comprises an outer member having an inner spherical surface, an inner member fitted in said outer member and having an outer spherical surface facing said inner spherical surface of the outer member, and a cage member interposed between the inner and outer members, said cage member having an outer spherical surface facing the inner spherical surface of the outer member and an inner spherical surface facing the outer spherical surface of the inner member, said cage member having windows therein and balls disposed in said windows and projecting outwardly therefrom, and engaged in respective opposed ball grooves provided in said inner and outer members, the improvement of the joint being obtained in that said mutually facing spherical surfaces of the outer member and the cage member are slightly eccentric with respect to one another so that a gap formed between the two spherical surfaces gradually decreases towards one end of the joint and said surfaces come into contact in a first contact region, while said mutually facing spherical surfaces of the inner member and the cage member are slightly eccentric with respect to one another so that a second gap formed between these two spherical surfaces decreases gradually towards the other end of the joint and said surfaces come into contact at a second contact zone. By virtue of this construction the first and second contact zones of the cage with the outer and inner members maintain the cage in axial position in the joint and obviates the displacement of the cage member produced in the conventional joint due to unavoidable gap formation.

It is a further object of the invention to provide a method for blocking the axial movement of the cage member due to the unavoidable formation of gaps caused by manufacturing tolerances.

In accordance with the method of the invention, contact zones are formed between the cage member and the inner and outer members at respective opposite sides of the cage member and said cage member is held in axially secured position by said contact zones.

Preferably the contact zones are formed as circular contact regions on opposite sides of the cage member.

The invention will next be described in conjunction with various embodiments thereof with reference to the attached drawing.

BRIEF DESCRIPTION OF THE SEVERAL VIEW OF THE DRAWING

In the drawing:

FIG. 1 diagrammatically illustrates, in longitudinal section, a conventional constant velocity joint in one position of operation;

DETAILED DESCRIPTION

Figure 3:
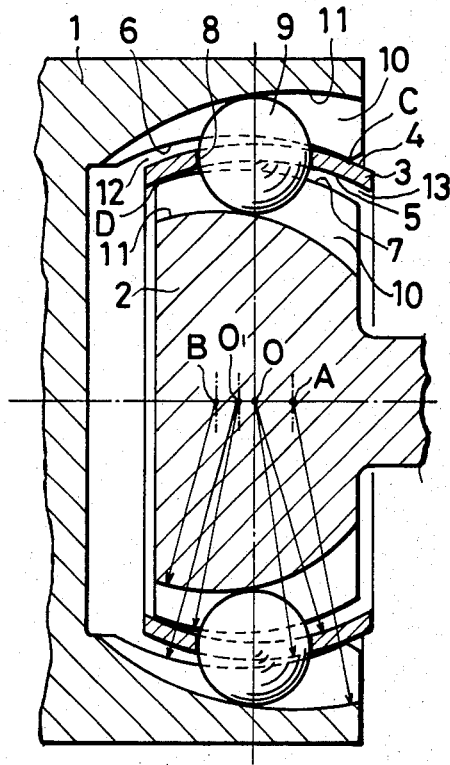
FIG. 3 is a longitudinal section of a constant velocity universal joint according to the invention.

Referring to FIG. 3 showing one embodiment of the invention, therein is seen an outer member 1 and an inner member 2 mounted together through a cage member 3. The cage member 3 has an outer spherical surface 4 and an inner spherical surface 5 which are concentric to one another and surfaces 4 and 5 have a common center which is coincident with the joint center O. The outer spherical surface 4 faces an inner spherical surface 6 of the outer member 1 and the inner spherical surface 5 faces an outer spherical surface 7 of the inner member 2. The cage member 3 is provided with a plurality of windows 8 containing respective balls 9, each of which is in engagement with mutually facing pairs of axially extending guide grooves 10 formed in the mutually facing surfaces 6 and 7 of the outer member 1 and the inner member 2. The guide grooves 10 are formed so that their bottom surfaces 11 extend along eccentric arcs disposed on respective spherical surfaces which are eccentric to one another and have mutually offset centers A, B. Thus, the bottom surfaces 11 of the grooves define therebetween a wedge form which gradually widens towards one end (to the right in FIG. 3). Thus, each ball 9 can be subjected to a pushing force F tending to move the ball toward one end, that is, to the right in FIG. 3.

Figure 1:
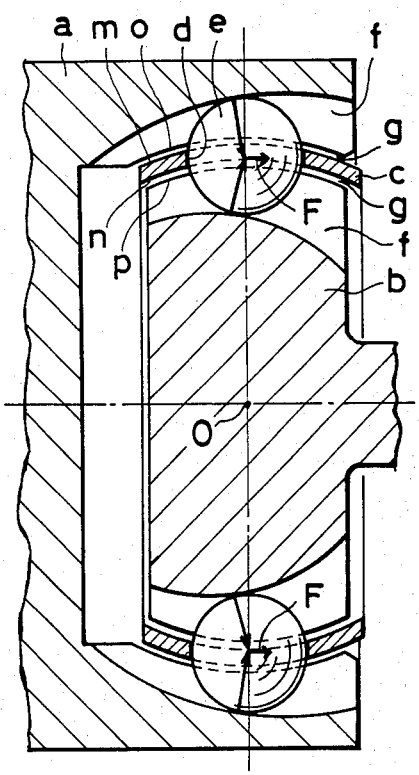
Figure 2:
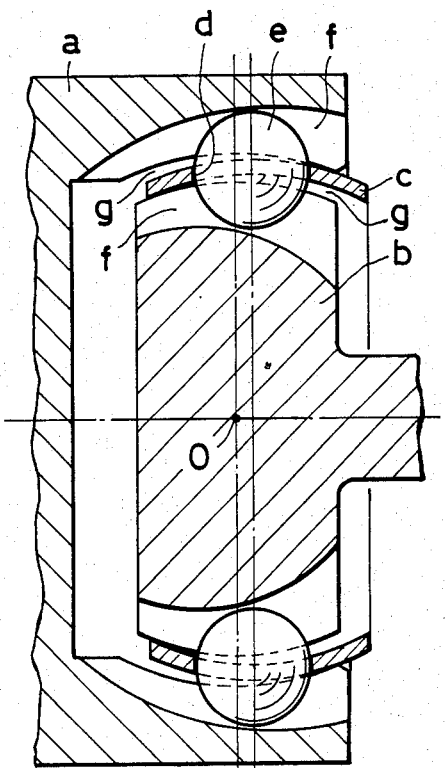
FIG. 2 shows the joint in FIG. 1 in another position of operation.

In this arrangement, gaps 12 and 13 can be unavoidably formed between respective members 1 and 2 and cage 3 as a result of manufacturing tolerances. The gaps have been illustrated with exaggeration for explanatory purposes. Ordinarily it is to be recalled that in the conventional construction illustrated in FIGS. 1 and 2, the cage member 3 could travel from one end to the other within the range of the gaps under the action of force F action thereon through the balls 9.

The construction of the invention seeks to eliminate such movement. For this purpose, the mutually facing contact engaging spherical surfaces 4, 6 of the outer member 1 and the cage member 3 are slightly eccentric so that the gap 12 between the spherical surfaces 4, 6 gradually decreases towards one end, while the mutually facing contact engaging spherical surfaces 5, 7 of the inner member 2 and the cage member 3 are slightly eccentric so that the gap 13 between the two spherical surfaces 5, 7 decreases gradually towards the other end.

Namely, the center of curvature of the spherical surface 6 is slightly displaced toward the left in FIG. 3 from the center O of the spherical surface 4 so as to be positioned at a point $O_1$, so that the gap 12 gradually decreases towards the right and finally becomes zero at a point C near the right end of the joint. In other words, the two spherical surfaces 4 and 6 (each of which is continuous and has a respective constant radius of curvature over its entire extent) are brought into pressure contact with one another at the point C which represents a circular contact zone between the spherical surfaces 4 and 6. On the other hand, the center of curvature of the spherical surface 7 is displaced toward the left from the center O of the spherical surface 5 so as to be positioned at the point $O_1$, so that the gap 13 decreases gradually towards the left and finally becomes zero at a point D near the left end of the joint. In other words, the two spherical surfaces 5 and 7 are arranged to be brought into pressure contact with one another at the point D which represents a circular contact zone between the spherical surfaces 5 and 7. Thus, the cage member 3 is maintained in a position in which the cage is in engagement at the point C with the outer member 1 and at the same time is in engagement at the point D with the inner member 2 in order always to be supported by members 1 and 2 from both sides thereof at axially displaced contact zones C and D. Thereby, the cage 3 is prevented from being axially displaced from one side to the other. The magnitude of the displacement of the point $O_1$ from the center of the joint, that is, the distance between the point O and the point $O_1$ is, for example, about 0.15 mm.

Figure 4:
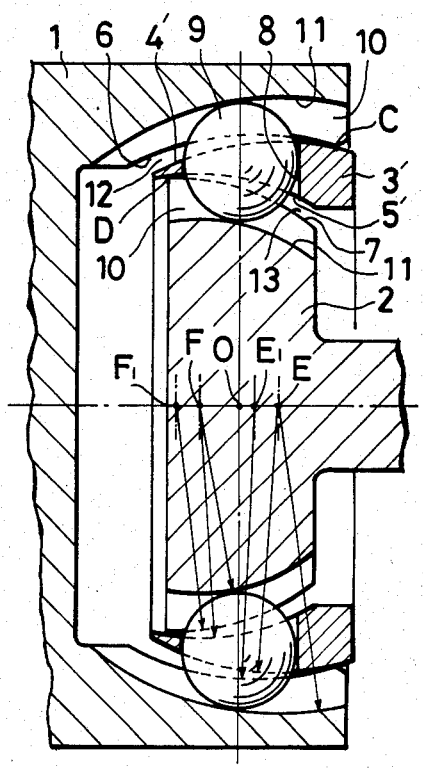
FIG. 4 is a longitudinal section of another embodiment of a constant velocity universal joint according to the invention.

FIG. 4 illustrates another embodiment in which the cage member 3′ is of offset type wherein the outer spherical surface 4′ and the inner spherical surface 5′ are eccentric to one another, the remaining parts of the joint being essentially the same as those described in respect of FIG. 3. Namely, in this embodiment, the center of the outer spherical surface 4′ and the center of the inner spherical surface 5′ are located respectively at points E and F on both sides of the joint center O, and the center of the spherical surface 6 on the outer member 1 side is displaced slightly towards the left from the point E so as to be positioned at a point $E_1$, and the center of the spherical surface 7 on the inner member 2 side is displaced slightly towards the left from the point F as to be located at a point $F_1$. Consequently, the cage member 3 is supported at both sides at the zones denoted by points C and D. In this case, the amount of each displacement between points E and $E_1$ and F and $F_1$, respectively, is also about 0.15 mm.

Figure 5:
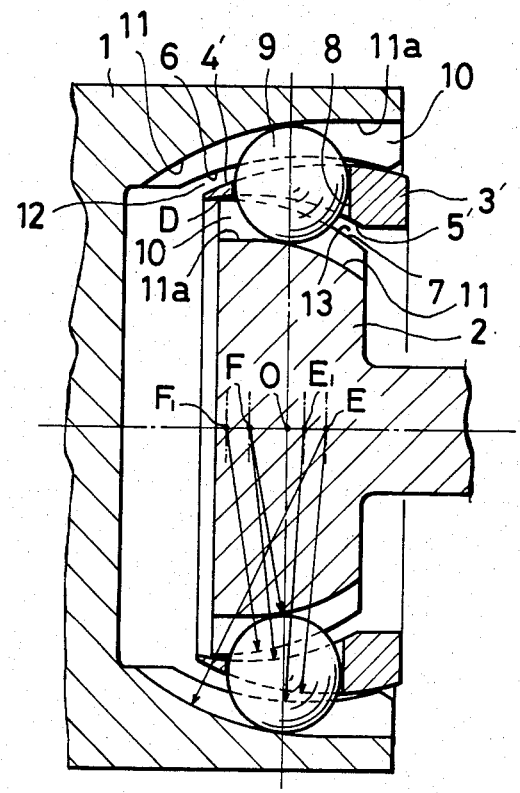
FIG. 5 is a longitudinal section of a modified embodiment of a constant velocity universal joint according to the invention.

FIG. 5 illustrates a modified embodiment in which each of the respective groove bottom surfaces 11 is so formed that its forward portion is substantially rectilinear as established by linear surface 11a. The remaining parts of the joint are essentially the same as those in the embodiment in FIG. 4.

Thus, according to this invention, the gap between the confronting, contact surfaces of the cage member and the outer member is gradually decreased towards one end, and the gap between the confronting, contact surfaces of the cage member and the inner member is gradually decreased towards the other end, so that the cage member is supported at both sides by the inner and outer members, in order to be maintained axially in its neutral position, thereby eliminating the disadvantage associated with the conventional construction in which the cage member is movable from one side to the other.

Although the invention has been described in relation to specific embodiments thereof, it will become apparent to those skilled in the art, that numerous modifications and variations can be made within the scope and spirit of the invention as defined in the attached claims.

What is claimed is:

1. A constant velocity universal joint comprising an outer member having an inner spherical surface with a constant radius of curvature, an inner member fitted in said outer member and having an outer spherical surface facing said inner spherical surface of the outer member, said outer spherical surface of said inner member having a constant radius of curvature, said inner and outer members being adapted for relative angular travel about a center of the joint, a cage member interposed between said inner and outer members, said cage member having an outer spherical surface facing the inner spherical surface of the outer member for operative contact engagement therewith and an inner spherical surface facing the outer spherical surface of the inner member for operative contact engagement therewith, said cage member having windows therein, and balls disposed in said windows and projecting outwardly therefrom, said inner and outer members being provided with respective opposed ball grooves in which said balls are engaged, said mutually facing spherical surfaces of the outer member and the cage member being slightly eccentric with respect to one another so that a gap formed between the two spherical surfaces gradually decreases continuously from one end towards the other end of the joint and said surfaces come into pressure contact in a first contact zone proximate said other end, while said mutually facing spherical surfaces of the inner member and the cage member are slightly eccentric with respect to one another so that a second gap formed between these two spherical surfaces gradually decreases continuously from said other end to said one end of the joint and said surfaces come into pressure contact at a second contact zone proximate said one end, said first and second pressure contact zones of said cage respectively with said outer and inner members proximate said ends of the joint maintaining said cage in axial position in said joint while permitting universal movement of said inner and outer members about the joint center with operating engagement of said confronting spherical surfaces of said cage member and said inner and outer members.

2. A constant velocity universal joint as claimed in claim 1, wherein the outer spherical surface and the inner spherical surface of the cage member are concentric and have a common center.

3. A constant velocity universal joint as claimed in claim 2, wherein said common center of said spherical surfaces of said cage member is located on the center of the joint.

4. A constant velocity universal joint as claimed in claim 1, wherein the outer spherical surface and the inner spherical surface of the cage member are eccentric and have mutually offset centers.

5. A constant velocity universal joint as claimed in claim 4, wherein said mutually offset centers of said inner and outer spherical surfaces of said cage member are located on respective opposite sides of said center of the joint.

6. A constant velocity universal joint as claimed in claims 1, 2 or 4, wherein the magnitude of eccentric offset between the centers of the surfaces of the cage and the mutually facing surfaces of the inner and outer members is about 0.15 mm.

7. A constant velocity universal joint as claimed in claim 1, wherein said ball grooves in said inner and outer members have respective bottom surfaces which are offset such that said ball grooves have a wedge shape.

8. A constant velocity universal joint as claimed in claim 7, wherein said bottom surfaces of said ball grooves extend along arcs having offset centers.

9. A constant velocity universal joint as claimed in claim 7, wherein said bottom surfaces of said ball grooves respectively extend in part along arc portions having offset centers and in part along substantially linear portions.

10. In a constant velocity universal joint comprising an outer member having an inner spherical surface with a constant radius of curvature, an inner member fitted in said outer member and having an outer spherical surface facing said inner spherical surface of the outer member, said outer spherical surface of said inner member having a constant radius of curvature, said inner and outer members being adapted for relative angular travel about a center of the joint, a cage member interposed between said inner and outer members, said cage member having an outer spherical surface facing the inner spherical surface of the outer member for operative contact engagement therewith and an inner spherical surface facing the outer spherical surface of the inner member for operative contact engagement therewith, said cage member having windows therein, and balls disposed in said windows and projecting outwardly therefrom, said inner and outer members being provided with respective opposed ball grooves in which said balls are engaged, the improvement wherein said mutually facing spherical surfaces of the outer member and the cage member are slightly eccentric with respect to one another so that a gap formed between the two spherical surfaces gradually decreases from one end towards the other end of the joint and said surfaces come into contact in a first contact zone proximate said other end, while said mutually facing spherical surfaces of the inner member and the cage member are slightly eccentric with respect to one another so that a second gap formed between these two spherical surfaces decreases gradually from said other end of the joint towards said one end of the joint and said surfaces come into contact at a second contact zone proximate said one end, said first and second contact zones of said cage respectively with said outer and inner members proximate said ends of the joint maintaining said cage in axial position in said joint while permitting universal movement of said inner and outer members about the joint center with operating engagement of said confronting spherical surfaces of said cage member and said inner and outer members.

11. The improvement as claimed in claim 10, wherein the outer spherical surface and the inner spherical surface of the cage member are concentric and have a common center.

12. The improvement as claimed in claim 11, wherein said common center of said spherical surfaces of said cage member is located on the center of the joint.

13. The improvement as claimed in claim 10, wherein the outer spherical surface and the inner spherical surface of the cage member are eccentric and have mutually offset centers.

14. The improvement as claimed in claim 13, wherein said mutually offset centers of said inner and outer spherical surfaces of said cage member are located on respective opposite sides of said center of the joint.

15. The improvement as claimed in claim 14, wherein the magnitude of eccentric offset between the centers of the surfaces of the cage and the mutually facing surfaces of the inner and outer members is about 0.15 mm.

16. An improvement as claimed in claim 15, wherein said ball grooves in said inner and outer members have respective bottom surfaces which are offset such that said ball grooves have a wedge shape.

17. An improvement as claimed in claim 16, wherein said bottom surfaces of said ball grooves extend along arcs having offset centers.

18. An improvement as claimed in claim 17, wherein said bottom surfaces of said ball grooves respectively extend in part along arc portions having offset centers and in part along substantially linear portions.

* * * * *